United States Patent
El-Khamy et al.

(10) Patent No.: US 10,726,525 B2
(45) Date of Patent: Jul. 28, 2020

(54) IMAGE DENOISING NEURAL NETWORK ARCHITECTURE AND METHOD OF TRAINING THE SAME

(71) Applicant: Samsung Electronics Co., Ltd., Suwon-si, Gyeonggi-do (KR)

(72) Inventors: Mostafa El-Khamy, San Diego, CA (US); Igor Fedorov, San Diego, CA (US); Jungwon Lee, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 50 days.

(21) Appl. No.: 15/926,301

(22) Filed: Mar. 20, 2018

(65) Prior Publication Data
US 2019/0096038 A1 Mar. 28, 2019

Related U.S. Application Data

(60) Provisional application No. 62/563,623, filed on Sep. 26, 2017.

(51) Int. Cl.
*G06T 5/00* (2006.01)
*G06N 3/08* (2006.01)

(52) U.S. Cl.
CPC .......... *G06T 5/002* (2013.01); *G06N 3/08* (2013.01); *G06T 2207/20081* (2013.01); *G06T 2207/20084* (2013.01)

(58) Field of Classification Search
CPC .......... G06T 5/002; G06T 2207/20081; G06T 2207/20084; G06N 3/08
See application file for complete search history.

(56) References Cited

U.S. PATENT DOCUMENTS

2016/0093048 A1 3/2016 Cheng et al.
2016/0253787 A1* 9/2016 Chen ................. G06T 5/002
382/275

FOREIGN PATENT DOCUMENTS

CN 105894469 A 8/2016
CN 106529589 A 3/2017

OTHER PUBLICATIONS

Tal Remez et al "Deep Convolutional Denoising of Low-Light Images" School of Electrical Engineering, Jan. 2017. (Year: 2017).*
Tala Larrue et al "Denoising Videos with Convolutional Autoencoders" University of Maryland, Jul. 2017. (Year: 2017).*
Lore, Kin Gwn, et al., "LLNet: A Deep Autoencoder Approach to Natural Low-light Image Enhancement", Jun. 13, 2016, pp. 1-29, Iowa State University, Ames, IA.
Agostinelli, Forest, et al. "Adaptive Multi-Column Deep Neural Networks with Application to Robust Image Denoising", 2013, pp. 1-9, AMC-SSDA, University of Michigan, Ann Arbor, MI.
Zhao, Wenzhao, et al., "Poisson Denoising with Sparse Auto-Encoder", Aug. 8, 2015, pp. 1-5, vol. 14, Journal of Latex Class Files.

(Continued)

*Primary Examiner* — Leon Flores
(74) *Attorney, Agent, or Firm* — Lewis Roca Rothgerber Christie LLP (57) ABSTRACT

An image denoising neural network training architecture includes an image denoising neural network and a clean data neural network, and the image denoising neural network and clean data neural network share information between each other.

22 Claims, 3 Drawing Sheets

(56) References Cited

OTHER PUBLICATIONS

Vincent, Pascal et al., "Stacked Denoising Autoencoders: Learning Useful Representations in a Deep Network with a Local Denoising Criterion", Dec. 2010, pp. 3371-3408, Journal of Machine Learning Research.
Alessandro Foi, "Optimization of variance-stabilizing transformations," Preprint, 2009b, vol. 94, pp. 1809-1814, 2009.
Alireza Makhzani and Brendan Frey, "k-sparse autoencoders," in International Conference on Learning Representations (JCLR), 2014.
Augustin Lefevre, Francis Bach, and Cedric Fevotte, "Itakura-saito nonnegative matrix factorization with group sparsity," in Acoustics, Speech and Signal Processing (ICASSP), 2011 IEEE International Conference on. IEEE, 2011, pp. 21-24.
Bruno a Olshausen and David J Field, "Sparse coding with an overcomplete basis set: A strategy employed by vl?," Vision research, vol. 37, No. 23, pp. 3311-3325, 1997.
Christopher Poultney, Sumit Chopra, Yann L Cun, et al., "Efficient learning of sparse representations with an energy-based model," in Advances in neural information processing systems, 2007, pp. 1137-1144.
Diederik Kingma and Jimmy Ba, "Adam: A method for stochastic optimization," arXiv preprint arXiv:1412.6980, 2014.
Forest Agostinelli, Michael R Anderson, and Honglak Lee, "Adaptive multi-column deep neural networks with application to robust image denoising,"in Advances in Neural Information Processing Systems, 2013, pp. 1493-1501.
Geoffrey Hinton, "A practical guide to training restricted boltzmann machines," Momentum, vol. 9, No. 1, pp. 926, 2010.
Glenn E Healey and Raghava Kondepudy, "Radiometric ccd camera calibration and noise estimat ion," IEEE Transactions on Pattern Analysis and Machine Intelligence, vol. 16, No. 3, pp. 267-276, 1994.
Igor Fedorov, Alican Nalci, Ritwik Giri, Bhaskar D Rao, Truong Q Nguyen, and H Garudadri, "A unified framework for sparse nonnegative least squares using multiplicative updates and the nonnegative matrix factorization problem," arXiv preprint arXiv: 1604.02 181.
Igor Fedorov, Bhaskar D Rao, and Truong Q Nguyen, "Multimodal sparse bayesian dictionary learning applied to multimodal data classification," in Acoustics, Speech and Signal Processing (ICASSP), 2017 IEEE International Conference on. IEEE, 2017, pp. 2237-2241.
J Ho Curtiss, "On transformations used in the analysis of variance," the Annals of Mathematical Statistics, vol. 14, No. 2, pp. 107-122, 1943.
Jianchao Yang, John Wright, Thomas S Huang, and Yi Ma, "Image super-resolution via sparse representation," IEEE transactions on image processing, vol. 19, No. 11, pp. 2861-2873, 2010.
John A Nelder and Roger Mead, "A simplex method for function minimization," The computer journal, vol. 7, No. 4, pp. 308-313, 1965.
Jonathan Masci, Ueli Meier, Dan Cire an, and Jurgen Schmidhuber, "Stacked convolutional auto-encoders for hierarchical feature extraction, " Artifical Neural Networks and Machine Learning-ICANN 2011, pp. 52-59, 2011.
Joseph Salmon, Zachary Harmany, Charles-Alban Deledalle, and Rebecca Willett, "Poisson noise reduction with non-local pca," Journal of mathematical imaging and vision, vol. 48, No. 2, pp. 279-294, 2014.
Julien Mairal, Francis Bach, Jean Ponce, and Guillermo Sapiro, "Online dictionary learning for sparse coding," in Proceedings of the 26th annual international conference on machine learning. ACM, 2009, pp. 689-696.
Junyuan Xie, Linli Xu, and Enhong Chen, "Image denoising and inpainting with deep neural networks," in Advances in Neural Information Processing Systems, 2012, pp. 341-349.
Kin Gwn Lore, Adedotun Akintayo, and Soumik Sarkar , "LLNet: A deep autoencoder approach to natural low-light image enhancement," Pattern Recognition, vol. 61, pp. 650-662, 2017.
Kostadin Dabov, Alessandro Foi, Vladimir Katkovnik, and Karen Egiazarian, "Image denoising by sparse 3-d transform-domain collaborative filtering," IEEE Transactions on image processing, vol. 16, No. 8, pp. 2080-2095, 2007.
Lucio Azzari and Alessandro Foi, "Variance stabilization for noisy+ estimate combination in iterat ive poisson denoising," IEEE Signal Processing Letters, vol. 23, No. 8, pp. 10861090, 2016.
M. Everingham, L. Van Gool, C. K. I. Williams, J. Winn, and A. Zisserman "The Pascal Visual Object Classes Challenge 2010 (VOC2010) Results," htt p:// www. pascal-network.org/challenges/VOC/voc2010/workshop/index.html.
Markku Makita and Alessandro Foi, "Optimal inversion of the anscombe transformation in low-count poisson image denoising," IEEE Transactions on Image Processing, vol. 20, No. 1, pp. 99-109, 2011.
Michal Aharon, Michael Elad, and Alfred Bruckstein, "rmk-svd: An algorithm for designing overcomplete dictionaries for sparse representation," IEEE Transactions on signal processing, 12vol. 54, No. 11, pp. 4311-4322, 2006.
Miriam Cha, Youngjune Gwon, and HT Kung, "Multimodal sparse representation learning and applications," arXiv preprint arXiv:1511.06238, 2015.
Pierre Baldi and Kurt Hornik, "Neural networks and principal component analysis: Learning from examples without local minima." *Neural networks* , vol. 2, No. 1, pp. 53-58, 1989.
Samuel W Hasinoff, "Photon, poisson noise," in Computer Vision, pp. 608-610. Springer, 2014.
Soheil Bahrampour, Nasser M Nasrabadi, Asok Ray, and William Kenneth Jenkins, "Multi-modal task-driven dictionary learning for image classification," IEEE Transactions on Image Processing, vol. 25, No. 1, pp. 24-38, 2016.
Tom Le Paine, Pooya Khorrami, Wei Han, and Thomas S Huang, "An analysis of unsupervised pre-training in light of recent advances," arXiv preprint arXiv:1412.6597, 2014.
Xiaojuan Jiang, Yinghua Zhang, Wensheng Zhang, and Xian Xiao, "A novel sparse auto-encoder for deep unsupervised learning," in Advanced Computational Intelligence (/CACI), 2013 Sixth International Conference on IEEE, 2013, pp. 256-261.
Yanmin Qian, Tian Tan, and Dong Yu, "An investigation into using parallel data for far-field speech recognition," in Acoustics, Speech and Signal Processing (!CASSP), 2016 IEEE International Conference on. IEEE, 2016, pp. 5725-5729.
Y-Lan Boureau, Yann L Cun, et al., "Sparse feature learning for deep belief networks," in Advances in neural information processing systems, 2008, pp. 1185-1192.

\* cited by examiner

IMAGE DENOISING NEURAL NETWORK ARCHITECTURE AND METHOD OF TRAINING THE SAME

CROSS-REFERENCE TO RELATED APPLICATION

This utility patent application claims priority to and the benefit of U.S. Provisional Patent Application Ser. No. 62/563,623, filed Sep. 26, 2017 and entitled "SYSTEM AND METHOD FOR ENHANCING LOW LIGHT SHOT IMAGES WITH DEEP DENOISING AUTOENCODERS," the entire content of which is incorporated herein by reference.

FIELD

Aspects of example embodiments of the present disclosure relate to an image denoising neural network architecture and a method of training an image denoising neural network.

BACKGROUND

When a digital image is taken under relatively low light conditions, for example, at dusk or nighttime, noise (also referred to as image noise) is often present in the resulting image. The image noise may present as a random variation in brightness or color information that results from, for example, a sensor (e.g., a charge-coupled device (CCD) sensor, a complementary-metal-oxide semiconductor (CMOS) sensor) and/or related circuitry of a capture device (e.g., a digital camera, a cell phone camera). Due to the lower photon count present in low light photography (e.g., due to fewer photons being received and/or measured by the sensor of the capture device), additional noise is generated by the capture device. The image noise is an undesirable component of the resultant image and leads to lower-quality images.

Generally, image noise includes two components—Gaussian noise and Poisson noise. Gaussian noise is the more typical type of noise (e.g., digital noise), often the result of circuit noise in the capture device. Poisson noise is less prevalent because it occurs more frequently (e.g., is more prevalent or noticeable) when an underlying signal (e.g., a low-light image signal) is relatively weak and the sensor response is quantized. In higher light conditions, the Poisson noise tends towards a normal distribution, such that Gaussian noise is more prevalent than Poisson noise in most images (e.g., in well-lit images).

When an image is captured in relatively low light conditions, the image noise has two components—a signal dependent component that may be modeled as Poisson noise distributed according to a rate of arrival of photons on a camera sensor (e.g., a CCD sensor or a CMOS sensor) and a signal independent component that may be modeled as Gaussian noise and is due to stationary disturbances in the image. The effective noise contains the two image noise components and can be referred to as "Poisson-Gaussian noise." Due to the signal-dependent noise component, the noise variance of the effective noise is not constant but varies with the expectation of the image's pixel values.

One current method of removing (or reducing) Poisson-Gaussian noise in a digital image (e.g., a digital image signal) includes applying a variance-stabilizing transform (also referred to as "VST"), such as an Anscombe or Generalized Anscombe transform, to produce a digital signal having a noise component with a constant variance that is independent of the value of the input signal, which can be considered to be similar to additive Gaussian noise (e.g., additive white Gaussian noise (AWGN) with unitary variance). That is, the VST is applied to the digital image to transform the Poisson noise, whose variance is equal to its mean and hence depends on the underlying pixel value, to a noise with constant variance. Then, the transformed noise is removed (or substantially removed) by using a denoising algorithm, which can efficiently remove noise, such as AWGN, which has constant variance, such as by block-matching and 3D filtering (also referred to as "BM3D"). Lastly, an inverse variance-stabilizing transform (also referred to as "IVST"), such as an inverse Anscombe transform, is applied to the denoised digital image to transform it back to its original domain. Taken together, this method of removing or reducing Poisson-Gaussian noise from an image may be referred to as "VST-BM3D-IVST."

However, the VST-BM3D-IVST method is sensitive to the forward transformation used in the first step, requiring that an unbiased inverse of the forward transformation is available to return the image to its original domain. Further, performance of the VST-BM3D-IVST method is relatively poor at very low intensity values, such as the case with images taken at a very low light level.

Some recently-attempted improvements to the VST-BM3D-IVST method include using iterative filtering of combinations of a noisy image with progressively refined (or filtered) images, but these improvements greatly increase the complexity of the VST-BM3D-IVST method and may not be suitable for use with relatively low-power (e.g., low processing power) mobile devices or the like.

Further, one recent deep learning approach to denoising low light images, called DeNoiseNet, attempts to learn a transformation from a Poisson noisy image (e.g., an image having a relatively high amount of Poisson noise) to a clean (denoised) image. This method, however, fails to consider noise variance stabilization.

SUMMARY

The present disclosure is directed toward various embodiments of an image denoising neural network architecture and a method of training an image denoising neural network.

According to one embodiment of the present disclosure, an image denoising neural network training architecture includes: an image denoising neural network; and a clean data neural network. The image denoising neural network and clean data neural network are configured to share information between each other.

The image denoising neural network may include: a variance-stabilizing transform (VST) network; an inverse variance-stabilizing transform (IVST) network; and a denoising network between the VST network and the IVST network.

The denoising network may include a plurality of convolutional autoencoders stacked on each other.

The VST network may include a plurality of filtering layers and rectifying layers together forming a convolutional neural network.

The image denoising neural network may be configured to learn a monotonic invertible transform that enforces a constant output variance of noise of an input image.

A first one of the filtering layers may be configured to perform a binning operation on the input image.

The IVST network may be trained to invert the transform of the VST network by minimizing a distance metric from an output from an identity transform and an expected output of a concatenation of the VST and the IVST networks.

The image denoising neural network may be trained by minimizing a mean square error distance between a noisy image and a non-noisy image input into the image denoising neural network.

Training of at least some of the filtering layers of the VST network and training of at least some of the filtering layers of the IVST network may be interleaved.

The clean data neural network may include a plurality of filtering layers and rectifier layers.

At least one of the filtering layers of the clean data neural network may be configured to share information with at least one of the filtering layers of the image denoising neural network.

The clean data neural network may be trained as a plurality of encoder-decoder pairs to learn a sparse latent representation of an input image by minimizing a distance metric between a decoding of the sparse latent representation and a clean input.

The training of the clean data neural network may be regularized by utilizing a sparsity constraint to learn a sparse latent representation.

According to another embodiment of the present disclosure, a method of training an image denoising neural network is provided. The image denoising neural network includes a variance-stabilizing transform network, an inverse variance-stabilizing transform network, and a denoising network. The method includes: jointly training the variance-stabilizing transform network and the inverse variance-stabilizing transform network; and training the denoising network.

The jointly training of the variance-stabilizing transform network and the inverse variance-stabilizing transform network may include a block-coordinate descent optimization in which, at each iteration, a parameter update is performed to decrease a variance-stabilizing transform network objective and a parameter update is performed to decrease an inverse variance-stabilizing transform network objective.

The joint training of the variance-stabilizing transform network and the inverse variance-stabilizing transform network may include utilizing a gradient-based stochastic optimization.

The gradient-based stochastic optimization may include the Adam algorithm.

The training of the denoising network may include: inputting a denoised image into a clean data sparse denoising autoencoder; inputting a noisy version of the denoised image into a noisy data sparse denoising autoencoder; and training the noisy data sparse denoising autoencoder to output the denoised image by utilizing a stochastic gradient-based optimization technique.

The noisy data sparse denoising autoencoder may be trained by utilizing an objective function, and the objective function may be optimized to minimize a distance metric (e.g., an appropriately defined distance metric) between a decoded latent representation of the noisy version of the denoised image and a clean denoised input.

The training of the denoising network may be done jointly with the training of a clean data network by minimizing a combined cost function that minimizes squared error between decoded latent representations of the variance-stabilizing transform network and the inverse variance-stabilizing transform network and a clean denoised input.

Training may be regularized to enforce individual sparsity of the latent representations of both the clean data network and the denoising network, in addition to enforcing joint sparsity between an intermediate latent representations of the clean data network and the denoising network.

According to another embodiment of the present disclosure, an image denoising neural network training architecture includes an image denoising neural network and a clean data network. The image denoising neural network includes a plurality of filtering layers including: a variance-stabilizing transform (VST) network including a plurality of filtering layers; an inverse variance-stabilizing transform (IVST) network including a plurality of filtering layers; and a denoising network including a plurality of filtering layers. A plurality of the filtering layers of the clean data network are configured to communicate with a corresponding plurality of the filtering layers of the denoising network.

This summary is provided to introduce a selection of features and concepts of example embodiments of the present disclosure that are further described below in the detailed description. This summary is not intended to identify key or essential features of the claimed subject matter nor is it intended to be used in limiting the scope of the claimed subject matter. One or more of the described features according to one or more example embodiments may be combined with one or more other described features according to one or more example embodiments to provide a workable method or device.

DETAILED DESCRIPTION

The present disclosure is directed toward various embodiments of an image denoising neural network architecture and a method of training an image denoising neural network. In one example embodiment, an image denoising neural network training architecture includes an image denoising neural network and a clean data neural network. The image denoising neural network and clean data neural network may be configured to share information between each other. In some embodiments, the image denoising neural network may include a variance-stabilizing transform (VST) network, an inverse variance-stabilizing transform (IVST) network, and a denoising network between the VST network and the IVST network. The denoising network may include a plurality of convolutional autoencoders stacked on each other, and the VST and IVST networks may each include a plurality of filtering layers together forming convolutional neural networks.

Hereinafter, example embodiments of the present disclosure will be described, in more detail, with reference to the accompanying drawings. The present disclosure, however, may be embodied in various different forms and should not be construed as being limited to only the embodiments illustrated herein. Rather, these embodiments are provided as examples so that this disclosure will be thorough and complete and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated.

It will be understood that, although the terms "first," "second," "third," etc., may be used herein to describe various elements, components, and/or layers, these elements, components, and/or layers should not be limited by these terms. These terms are used to distinguish one element, component, or layer from another element, component, or layer. Thus, a first element, component, or layer described below could be termed a second element, component, or layer without departing from the scope of the present disclosure.

It will also be understood that when an element, component, or layer is referred to as being "between" two elements, components, or layers, it can be the only element between the two elements, components, or layers, or one or more intervening elements, components, or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components but do not preclude the presence or addition of one or more other features, integers, steps, operations, elements, components, and/or groups thereof. That is, the processes, methods, and algorithms described herein are not limited to the operations indicated and may include additional operations or may omit some operations, and the order of the operations may vary according to some embodiments. As used herein, the term "and/or" includes any and all combinations of one or more of the associated listed items.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "example" is intended to refer to an example or illustration.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

A processor, central processing unit (CPU), graphics processing unit (GPU), field-programmable gate array (FPGA), sensor, capture device, circuitry, neural networks, filtering layers, detectors, sensors, autoencoders, denoisers, encoders, decoders, and/or any other relevant devices or components according to embodiments of the present disclosure described herein may be implemented utilizing any suitable hardware (e.g., an application-specific integrated circuit), firmware, software, and/or a suitable combination of software, firmware, and hardware. For example, the various components of the processor, CPU, GPU, neural networks, filtering layers, detectors, sensors, autoencoders, denoisers, encoders, decoders, and/or the FPGA may be formed on (or realized in) one integrated circuit (IC) chip or on separate IC chips. Further, the various components of the processor, CPU, GPU, neural networks, filtering layers, detectors, sensors, autoencoders, denoisers, encoders, decoders, and/or the FPGA may be implemented on a flexible printed circuit film, a tape carrier package (TCP), a printed circuit board (PCB), or formed on the same substrate as the processor, CPU, GPU, and/or the FPGA. Further, the described actions, neural networks, filtering layers, encoders, decoders, autoencoders, etc. may be processes or threads, running on one or more processors (e.g., one or more CPUs and/or one or more GPUs), in one or more computing devices, executing computer program instructions and interacting with other system components to perform the various functionalities described herein. The computer program instructions may be stored in a memory, which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device or the functionality of a particular computing device may be distributed across one or more other computing devices without departing from the scope of the exemplary embodiments of the present disclosure.

Figure 1:
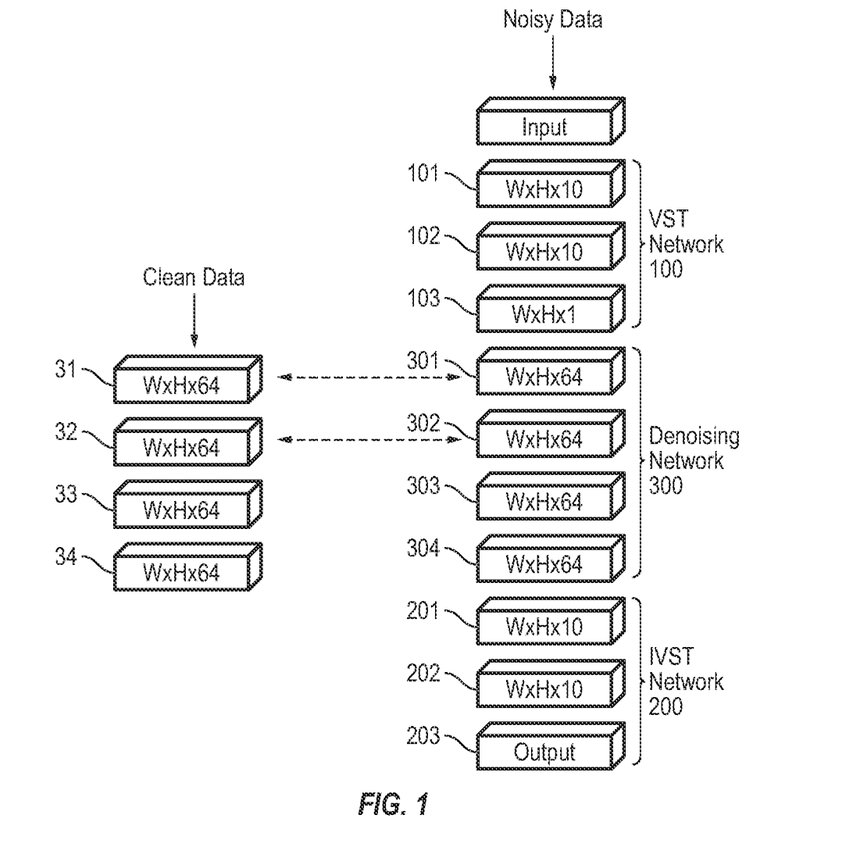
FIG. 1 is an illustration of a Poisson-Gaussian denoising training architecture, according to an embodiment.
Figure 4:
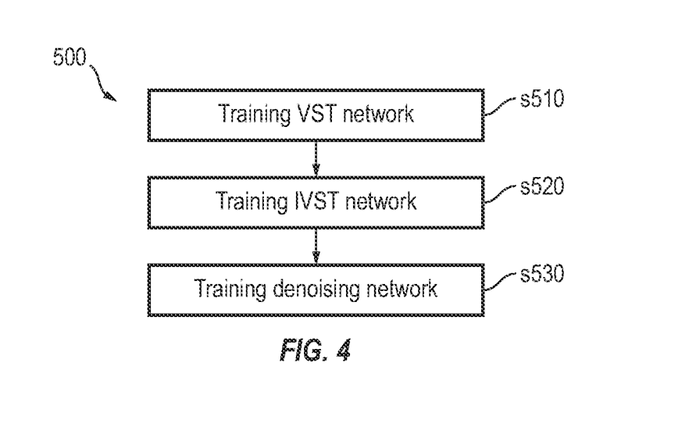
FIG. 4 is a flowchart illustrating a method of training an image denoising neural network, according to an embodiment.

An image denoising neural network training architecture (e.g., a Poisson-Gaussian denoising training architecture) according to an embodiment of the present disclosure is shown in FIG. 1, and a method of training an image denoising neural network (e.g., a Poisson-Gaussian denoising architecture) 20 according to an embodiment of the present disclosure is illustrated in FIG. 4.

Referring to FIG. 1, in one embodiment of the present disclosure, the image denoising neural network includes a variance stabilization transform (VST) neural network (e.g., a convolutional variance stabilization network, a convolutional VST, or a VST encoder) 100, an inverse variance stabilization transform (IVST) neural network (e.g., an IVST decoder) 200, and a denoising network (e.g., a stacked denoising autoencoder) 300 between the VST network 100 and the IVST network 200.

Each of the VST network 100 and IVST network 200 may be a three-layer convolution neural network (CNN); however, the present disclosure is not limited thereto. In other embodiments, the VST network 100 and the IVST network 200 may have more than three or fewer than three layers. Together, the VST network 100 and IVST network 200 may be considered a Poisson denoiser. In some embodiments, the VST and IVST networks 100/200 may have the same number of layers. However, the present disclosure is not limited thereto, and in other embodiments, the VST and IVST networks 100/200 may have a different number of layers with respect to each other.

The three-layer convolution neural network of the VST network 100 may include first-third filtering layers 101-103, and the three-layer convolution neural network of the IVST network 200 may include first-third filtering layers 201-203.

The first filtering layers 101/201 may have a 3×3×1×10 dimension (e.g., pixel dimension), the second filtering layers 102/202 may have a 1×1×10×10 dimension, and the third filtering layers 103/203 may have a 1×1×10×1 dimension. The first filtering layers 101/201 have a 3×3 dimension to utilize a binning operation, which includes summing, or taking a weighted average of, pixels in a small region (e.g., a 3×3 pixel region) of an image before processing it through the VST network 100. The first filtering layers 101/201 may be convolutional kernels having 3×3 2D dimension, the second filtering layers 102/202 may be a rectifier (e.g., a rectified linear unit or ReLU) having a 1×1 dimension, and the third filtering layers 103/203 may be another rectifier having a 1×1 dimension.

In the VST network 100 and the IVST network 200, a rectified linear function may be applied to an output of the first filtering layers 101/201 and second filtering layers 102/202. For example, each of the first and second filtering layers 101,102/201,202 may be a rectifier (e.g., a rectified linear unit or ReLU). However, the present disclosure is not limited thereto, and in some embodiments, all of the filtering layers may be rectifiers or only one of the filtering layers may be a rectifier.

As discussed above, the denoising network 300 is between the VST network 100 and the IVST network 200. The denoising network 300 may be considered the Gaussian denoiser. In some embodiments, the denoising network 300 may include (or may be) one or more stacked convolutional autoencoders (SCAE). An autoencoder, according to embodiments of the present disclosure, has a single hidden layer neural network architecture, which can be used to learn meaningful representations of data in an unsupervised fashion. A method of training the SCAEs according to embodiments of the present disclosure is described below.

Similar to the VST and IVST networks 100/200, the denoising network 300 may be a convolution neural network (CNN) including a plurality of filtering layers. For example, the denoising network 300 may include four filtering layers 301-304. In some of the embodiments, each of the filtering layers 301-304 may have a 3×3×1×10 dimension, and the first and second filtering layers 301/302 may each be a rectifier (e.g., a rectified linear unit or ReLU). However, the present disclosure is not limited thereto, and in some embodiments, all of the filtering layers 301-304 may be rectifiers.

The denoising network 300 may use a stacked convolutional autoencoder (SCAE) architecture. Any suitable number of filters (e.g., filtering layers) of the SCAE in the denoising network 300 may be utilized. An autoencoder includes an encoder and a decoder.

The image denoising neural network training architecture may include a clean data network (e.g., a guiding network). The clean data network may be for training the denoising network 300 (e.g., for training the SCAEs of the denoising network 300). The clean data network may also be a convolution neural network (CNN) and may include a same number of filtering layers (e.g., first-fourth filtering layers) 31-34 as the denoising network 300. The clean data network may be trained deeper as an SCAE by gradually adding encoder-decoder pairs trained to learn sparse latent representations by minimizing the mean square between the original clean image and the reconstructed image with regularization to enforce sparsity of the latent representation. In some embodiments, the denoising network 300 and the clean data network may have the same architecture as each other. For example, in some of the embodiments, each of the filtering layers 31-34 may have a 3×3×1×10 dimension and only the first and second filtering layers 31/32 may be rectifiers. However, the present disclosure is not limited thereto, and the clean data network may have any number and/or arrangement of filtering layers.

Referring to FIGS. 1 and 4, a method of training the image denoising neural network by using the image denoising neural network training architecture (500) includes training the variance stabilization transform (VST) neural network 100 (s510), training the inverse variance stabilization transform (IVST) neural network 200 (s520), and/or training the denoising network 300 (s530).

In some embodiments, the VST network 100 and the IVST network 200 may be trained (e.g., optimized) by using a gradient-based stochastic optimization and/or a block-coordinate descent optimization. In some cases, gradient-based stochastic optimization may be used within the block-coordinate descent optimization. One example gradient-based stochastic optimization is the Adam algorithm, which is known to those skilled in the art.

In some embodiments, the training of the VST network 100 (s510) and the training of the IVST network 200 (s520) may be jointly (or concurrently) performed. For example, the VST network 100 and the IVST network 200 may be trained together. In some embodiments of the present disclosure, a block-coordinate descent optimization approach is utilized in which, at each iteration, a parameter update is performed to decrease the VST network 100 objective, followed by a parameter update to decrease the IVST network 200 objective. In this way, the VST network 100 and IVST network 200 are trained together (e.g., are jointly or concurrently trained).

The training of the denoising network 300 may include pre-training the denoising network 300, fine-tuning the denoising network 300, and guided training the denoising network 300. The guided training of the denoising network 300 utilizes the clean data network (see, e.g., FIG. 1). As described further below, the clean data network acts as a proxy for an optimal denoising network.

Further, information is shared between the clean data network and the denoising network 300 (see, e.g., dotted arrows in FIG. 1). The information sharing, described further below, regularizes the learning process of the denoising network 300. In addition, a loss function, described further below, is utilized, which enforces joint sparsity between the clean data (e.g., target data) input from the clean data network and the noisy data input into the denoising network 300.

Figure 5:
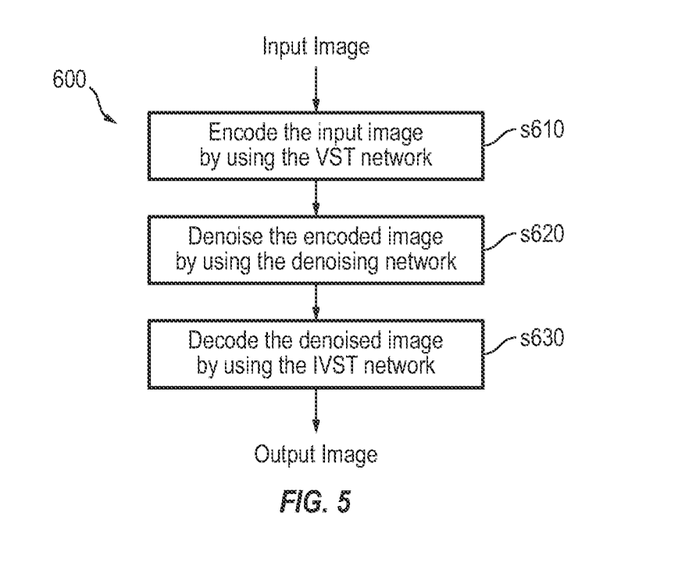
FIG. 5 is a flowchart illustrating a method of enhancing images taken under low light conditions by using the trained image denoising neural network, according to an embodiment.

After the image denoising neural network has been trained by, for example, the above-described method, the image denoising neural network may be utilized to enhance images taken under low light conditions according to an embodiment of the present disclosure. A method of enhancing images taken under low light conditions by using the trained image denoising neural network according to an embodiment of the present disclosure is illustrated in FIG. 5.

As discussed above, an image captured in relatively low light conditions generally has two image noise components—a signal dependent Poisson noise component and a signal independent Gaussian noise component.

An image (e.g., a corrupted or noisy image) input to the trained image denoising neural network is first acted upon by the VST network 100 (s610). The VST network 100 changes (e.g., transforms or encodes) the input image to have a constant variance rather than a variance dependent on an input signal (e.g., an input signal to a camera sensor). The VST network 100 is optimized to minimize a loss function that enforces the constant output variance while ensuring monotonicity to enforce invertibility of the learned transform under the conditional expectation with respect to the pixel value. The resulting image signal is corrupted with noise having a constant variance and can therefore be modeled as a Gaussian noise. That is, the trained VST network 100 acts to transform the Poisson noise in the input image into Gaussian noise.

Next, the image (e.g., the encoded image) is acted upon by the denoising network 300 (s620). The trained denoising network 300 removes (or reduces the amount of) the Gaussian noise in the image. For example, the image is passed through successive autoencoders to incrementally reduce the amount of Gaussian noise present in the image. The trained denoising network 300 can be trained by minimizing a perceptual loss compared to similarly transformed ground-truth non-noisy images or minimize the mean square error distance between the noisy and non-noisy images.

Next, the image is acted upon by the IVST network 200 (s630). The IVST network 200 acts a decoder to return the image to its original domain, essentially reversing the encoding completed by the VST network 100. The IVST network 200 is trained by minimizing the distance metric from the output from an identity transform and an expected output of the concatenation of the VST and the IVST networks 100/200. For example, the IVST network 200 learns based on an identity mapping under the expected output, for example:

$$\text{IVST}(E[\text{VST}(y)|x]) = x$$

where y|x~Poi(x) and E(V) denotes the expectation of V.

The above-described features and/or steps of embodiments of the present disclosure will be described further below.

Variance Stabilizing Transform (VST) Network 100 and Inverse Variance Stabilizing Transform (IVST) Network 200

When an image source x is recorded by a detector (e.g., a digital camera sensor), a digital image (e.g., a digital image signal) y is generated. Both x and y may be defined on a uniform spatial grid in which $y_{ij}$, the $(i, j)^{th}$ generated image pixel, depends only on $x_{ij}$. Due to the quantum nature of light, there is some amount of uncertainty in $y_{ij}$ given $x_{ij}$. A number of photons recorded by the detector (i, j) over T seconds then follows a Poisson distribution with rate $x_{ij}$. This Poisson distribution may be modeled by Equation 1.

$$y_{ij} | x_{ij} \sim Poi(y_{ij}; x_{ij}) = \frac{\exp(-x_{ij}) x_{ij}^{y_{ij}}}{y_{ij}!} \qquad \text{Equation 1}$$

A variance stabilization transform (VST) stabilizes the digital image and should, in an ideal case, permit (e.g., admit) an exact unbiased inverse. However, in some cases, the VST may not permit an exact unbiased inverse. For example, when the VST employs an Anscombe transform, an exact unbiased inverse may not be permitted. This stabilization requirement of the VST Ψ may be modeled by Equation 2.

$$\text{var}(\Psi(y)|x) = 1 \qquad \text{Equation 2:}$$

An ideal denoiser (e.g., an ideal Poisson denoiser) may be considered E[Φ(y)|x]. Next, x is recovered from E[Φ(y)|x] to provide the inverse VST. The inverse VST (IVST), Π, should then satisfy Equation 3.

$$\Pi(E[\Psi(y)|x]) = E[y|x] = x \qquad \text{Equation 3:}$$

However, according to some example embodiments, not every VST will provide an IVST satisfying Equation 3, and not every IVST will provide a VST satisfying both the stabilization and inversion requirements.

According to embodiments of the present disclosure, the VST network 100 and IVST network 200 are provided by two neural networks. A method of training the VST and IVST networks 100/200, according to an embodiment of the present disclosure, is described as follows.

The neural networks of the VST/IVST networks 100/200 may have the parameters $\theta_{VST}$ and $\theta_{IVST}$, respectively. A training set $\{x^n, \{y^{nm}\}_{m=1}^M\}_{n=1}^N$ is generated such that, for each $x^n$, $y^{nm}$ is drawn randomly from $Poi(y^{nm}, x^n)$. Let $\Omega^n = \{\Psi_{NN}(y^{nm})\}_{m=1}^M$, in which $\Psi_{NN}(\Psi)$ refers to the VST transformation realized by the VST neural network 100, and $\Psi_{NN}(y^{nm})$ is short-hand for the output of the VST network 100 in response to input $y^{nm}$. Without loss of generality, let $x^1 < x^2 < \ldots < x^N$. Then, a VST is provided, according to one embodiment, by optimizing Equation 4.

$$\underset{\theta_{VST}}{\operatorname{argmin}} \sum_{n=1}^{N} (\overline{\text{var}}(\Omega^n) - 1)^2 + \lambda \sum_{n=2}^{N} \max(0, \overline{E}[\Omega^{n'}] - \overline{E}[\Omega^n]) \qquad \text{Equation 4}$$

In Equation 4, n'=n−1, and $\overline{E}[\bullet]$ and $\overline{\text{var}}(\bullet)$ refer to computing the empirical mean and variance of the input data set, respectively. The first term in the objective function follows from the stabilization requirement, and the second term in the objective function is to ensure that the learned transform is monotonic and, hence, the invertibility condition is feasible. When the empirical mean of $\Omega^n$ is a monotonically increasing function of n, the second term in the objective function is equal to 0 and an IVST satisfying the invertibility condition is guaranteed to exist.

The IVST is learned, for example, by optimizing Equation 5, which follows from the invertibility condition.

$$\underset{\theta_{IVST}}{\operatorname{argmin}} \sum_{n=1}^{N} (\Gamma_{NN}(\overline{E}[\Omega^n]) - x^n)^2 \qquad \text{Equation 5}$$

In some embodiments of the present disclosure, a block-coordinate descent training approach is utilized to train the VST and IVST networks 100/200 in which, at each iteration, a parameter update is performed to decrease the VST objective, followed by a parameter update to decrease the IVST objective. Thus, the VST network 100 and IVST network 200 are trained together (e.g., are jointly or concurrently trained), ensuring a corresponding and accurate IVST exists for the trained VST.

Denoising Network 300

As described above with reference to FIG. 1, the denoising network 300 may include (or may be) one or more stacked convolutional autoencoders (SCAE). A method of training SCAEs as the denoising network 300 according to embodiments of the present disclosure is described below.

Considering an example in which the denoising network 300 includes K convolutional autoencoders. The output of the denoising network 300 in response to an input y is given by Equation 6.

$$SCAE_K(y) = f_1^D(f_2^D(f_K^E(\ldots f_1^D(y))))$$ Equation 6:

In Equation 6, $f_k^E(\cdot)$ and $f_k^D(\cdot)$ denote the encoding and decoding functions of the k'th convolutional autoencoder, respectively. The functions $f_k^E(\cdot)$ and $f_k^D(\cdot)$ are given by Equations 7 and 8, respectively.

$$f_k^E(y) = \{h_{kr}\}_{r=1}^R, h_{kr} = \phi(W_{kr}^E * y + b_{kr}^E)$$ Equation 7

$$f_k^D(\{h_{kr}\}_{r=1}^R) = \sum_{r=1}^R W_{kr}^D * h_{kr} + b_{kr}^D$$ Equation 8

In Equations 7 and 8, R denotes a number of filters in the encoder and decoder, and $\phi(\cdot)$ is a scalar non-linear function applied to each element of the input. Here, $\phi(\cdot)$ is set to be the rectified linear function.

According to some embodiments, the denoising network 300 may be further trained in two steps: 1) a pre-training (or baseline training) step; and 2) a fine-tuning step.

Denoising Network 300 Pre-Training

Figure 2:
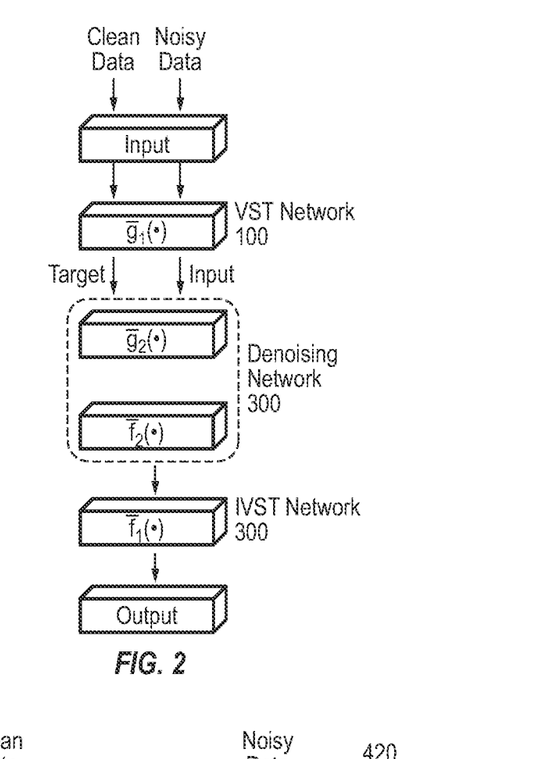
FIG. 2 is an illustration of a baseline training method for a stacked sparse denoising autoencoder (SSDA) network, according to an embodiment.

Referring to FIG. 2, the pre-training step, according to embodiments of the present disclosure, occurs after the training of the VST network 100 and IVST network 200. The pre-training of the denoising network (e.g., the denoising SCAE) 300 includes a sequence of K steps.

The denoising network 300 is presented with a noisy input (or noisy data) $\bar{y} \sim P(\bar{y}|y)$, in which y is the target data, and the goal is to recover y. The network parameters can be learned by replacing the input to the denoising network 300 in the objective function with $\bar{y}^i$. In FIG. 2, the encoder (e.g., the VST network 100) and the decoder (e.g., the IVST network 200) are referred to as $\bar{g}_1(\cdot)$ and $\bar{f}_1(\cdot)$, respectively, and to the latent representation of $\bar{y}$ as $\bar{h}$, where $\bar{h}=\bar{g}_1(\bar{y})$. The VST and IVST networks 100/200 may be treated as a first encoder/decoder pair.

As can be seen in FIG. 2, the denoising SCAE 300 is arranged between the trained VST network 100 and the trained IVST network 200. Considering a k'th encoder/decoder pair that is arranged between the (k-1)'th encoder/decoder pair (e.g., the VST/IVST network pair 100/200), the k'th encoder/decoder pair is optimized greedily while the other layers (e.g., the other encoder/decoder pairs) are frozen by using a loss function, shown as Equation 9.

$$\operatorname*{argmin}_{\theta_k} \sum_{i=1}^N \|x^i - \Gamma_{NN}(SCAE_k(\Psi_{NN}(y^i)))\|_2^2$$ Equation 9

In Equation 9, $\theta_k$ denotes weights and biases which parametrize the k'th denoising SCAE 300.

In some embodiments, a stacked sparse denoising autoencoder (SSDA) may be utilized in place of a single-layer sparse denoising autoencoder.

Denoising Network 300 Fine-Tuning

In some embodiments, the denoising network 300 fine-tuning includes end-to-end fine-tuning by optimizing Equation 10.

$$\operatorname*{argmin}_{\theta_{VST}, \theta_{IVST}, \{\theta_k\}_{k=1}^K} \sum_{i=1}^N \|x^i - \Gamma_{NN}(SCAE_K(\Psi_{NN}(y^i)))\|_2^2$$ Equation 10

Guided Learning

As discussed above, an SCAE, such as the SCAE of the clean network used to learn latent representation of the input signal, according to some example embodiments, has a neural network architecture, which can be used to learn meaningful representations of data in an unsupervised fashion. For example, an autoencoder includes an encoder g: $R^d \to R^m$ and a decoder f: $R^m \to R^d$. The encoder maps input y to a latent representation h given by Equation 11, and the decoder maps h to Equation 12.

$$h = g(y) = \phi(W_e y + b_e)$$ Equation 11:

$$f(h) = \psi(W_d h + b_d)$$ Equation 12:

In Equations 11 and 12, $\phi(\cdot)$ and $\psi(\cdot)$ are non-linear scalar functions applied to each element of the input vector. The goal is to have $f(g(y)) \approx y$ so as to reconstruct the clean signal y using the decoder f(h) after encoding it using the encoder g(y), so as to learn the latent representation h, and the network parameters can be learned by solving Equation 13.

$$\operatorname*{argmin}_{\theta} \sum_{i=1}^N \|y^i - f(g(y^i))\|_2^2$$ Equation 13

In Equation 13, $\theta = \{W_e, b_e, W_d, b_d\}$, N denotes the number of training points, and $y^i$ denotes the i'th training point.

However, autoencoders do not necessarily learn meaningful representations of the data, where the term meaningful is context dependent. To steer the autoencoders, additional constraints are added to the structure of the autoencoders or to the objective function such that the autoencoder is steered to learn latent representations with certain properties.

For instance, if h (of Equations 11 and 12, above) is constrained to be undercomplete, meaning m<d, then the autoencoder is forced to learn a compression of the data. In embodiments of the present disclosure, h is allowed to be overcomplete, meaning m>d. In this case, the autoencoder objective function is modified such that the autoencoder learns sparse latent representations. An autoencoder learning sparse latent representations may be referred to as a "sparse autoencoder." To this end, the objective function may be modified as Equation 14.

$$\operatorname*{argmin}_{\theta} \sum_{i=1}^N \|y^i - f(g(y^i))\|_2^2 + \lambda_1 \Omega(H)$$ Equation 14

When $H = [\hat{h}^1 \ldots \hat{h}^N]$, Equations 15 and 16 are as follows.

$$\Omega(H) = \sum_{j=1}^m \tau \log \frac{\tau}{\rho_j} + (1-\tau) \log \frac{1-\tau}{1-\rho_j}$$ Equation 15

-continued $$\rho_j = \frac{1}{N}\sum_{i=1}^{N} |h^i[j]| \qquad \text{Equation 16}$$

In Equations 15 and 16, $h^i[j]$ is the j'th element of $h^i$, and $\tau$ is a scalar which promotes sparsity when assigned a small value. The additional regularization represents the Kullback-Leibler divergence (KLD) between Bernoulli random variables with means $\tau$ and $\rho_j$, averaged over all j.

The sparse autoencoder is a useful architecture for denoising, in which case it is referred to as a "sparse denoising autoencoder." In this case, the input signal is the noisy signal $\overline{y}^i$, which is encoded by denoising encoder $\overline{g}$ and then decoded by denoising decoder $\overline{f}$ to constructed a clean signal $y^i$ from the noisy signal $\overline{y}^i$, and the encoder-decoder pair can be trained by minimizing the distance metric as in Equation 16b below.

$$\underset{\overline{\theta}}{\arg\min}\sum_{i=1}^{N} \|y^i - \overline{f}(\overline{g}(\overline{y}^i))\|_2^2 + \lambda_1 \Omega(H) \qquad \text{Equation 16b}$$

In some embodiments, the denoising network 300 can be made deeper by adding (e.g., stacking) additional denoising autoencoders whose input and target output may be represented by $\overline{g}_1(\overline{y})$ and $\overline{g}_1(y)$. The number of denoising autoencoders is not limited, and additional denoising autoencoders may be added, providing a deeper structure. In some embodiments, the SSDA parameters are learned in a greedy fashion by optimizing the denoising autoencoder objective for one sparse denoising autoencoder at a time. The stacked sparse denoising autoencoder (SSDA) structure is then used to initialize a deep neural network (DNN) denoiser, which is fine-tuned by optimizing Equation 17.

$$\underset{\overline{\theta}}{\arg\min}\sum_{i=1}^{N} \|y^i - DNN(\overline{y}^i)\|_2^2 \qquad \text{Equation 17}$$

In Equation 17, $DNN(\overline{y}^i)$ denotes the output of the denoising network 300 in response to input $\overline{y}^i$, and $\overline{\theta}$ denotes the set of all parameters of the DNN.

In some embodiments, the SSDA are trained. One challenge in learning a single sparse denoising autoencoder is in finding a good encoder $\overline{g}(\bullet)$. At a high level, the encoder defines the latent representation assigned to $\overline{y}$, and the quality of this representation may define the optimal denoising performance of the autoencoders. In some embodiments, the encoder $g(\bullet)$ of an autoencoder trained on clean data (e.g., a relatively noiseless image) (e.g., the clean data network) is utilized as a proxy for the optimal denoising encoder and to regularize the objective function used to train each denoising autoencoder by the distance between $\overline{g}(\bullet)$ and $g(\bullet)$. The distance between $g(\bullet)$ and $\overline{g}(\bullet)$ may be quantified by using a measure of the joint sparsity between h and $\overline{h}$.

A sparse denoising autoencoder (SDA) (e.g., a single SDA) may be trained jointly with the clean SCAE by modifying the objective function to include constraints on both the clean and noisy SCAEs as well as to enforce joint sparsity of their learned latent representations as in Equation 18.

$$\underset{\theta,\overline{\theta}}{\arg\min}\sum_{i=1}^{N} \|y^i - f(g(y^i))\|_2^2 + \lambda_1\Omega(H) + \qquad \text{Equation 18}$$
$$\lambda_2 \|\overline{y}^i - \overline{f}(\overline{g}(\overline{y}^i))\|_2^2 + \lambda_1\Omega(\overline{H}) + \lambda_3 \Psi(H,\overline{H})$$

In Equation 18, $\Psi(H, \overline{H})$ is defined by Equation 19.

$$\Psi(H,\overline{H}) = \sum_{i=1}^{N}\sum_{j=1}^{m} \log(|h^i[j]| + |\overline{h}^i[j]| + \epsilon) \qquad \text{Equation 19}$$

In Equation 18 (e.g., the objective function), the first and two terms correspond to the sparse autoencoder (e.g., the SDA) reconstruction loss of the clean network, the third and fourth terms correspond to the sparse autoencoder denoising loss, and the last term represents the guidance term linking $g(\bullet)$ to $\overline{g}(\bullet)$, which regularizes the learning by maximizing joint sparsity between the latent representations learned by the clean image network and the latent representations learned by the denoising network. The joint sparsity regularization seeks to promote $h^i$ and $\overline{h}^i$ with similar sparsity profiles.

In some embodiments, the guided SSDA (G-SSDA) objective function is differentiable and can be optimized using, for example, stochastic gradient-based optimization techniques.

Embodiments of the present disclosure provide a flexible approach to training the denoising network 300 that can be incorporated into various different denoising architectures (e.g., denoising neural networks) and can be modified such that a reconstruction error term is replaced with a classification error term. By replacing the reconstruction error term with the classification error term, the denoising neural network could be repurposed for image classification and organizing.

Initially, the guided autoencoder (e.g., the image denoising neural network) will be relatively far from the target image (e.g., the clean or noiseless image). Accordingly, early in the training, $\lambda_3$ (see, e.g., Equation 18) may not be used as a reference. However, as the training proceeds, the guided autoencoder improves, justifying a larger regularization parameter. Accordingly, in some embodiments, $\lambda_3$ increases at a log linear rate.

The guided SDA training method according to embodiments of the present disclosure may be extended to deeper structures (e.g., deeper networks). In other embodiments, the guiding autoencoder (e.g., the clean data network) may be used as an alternative training strategy to the guided SDA training method.

Figure 3:
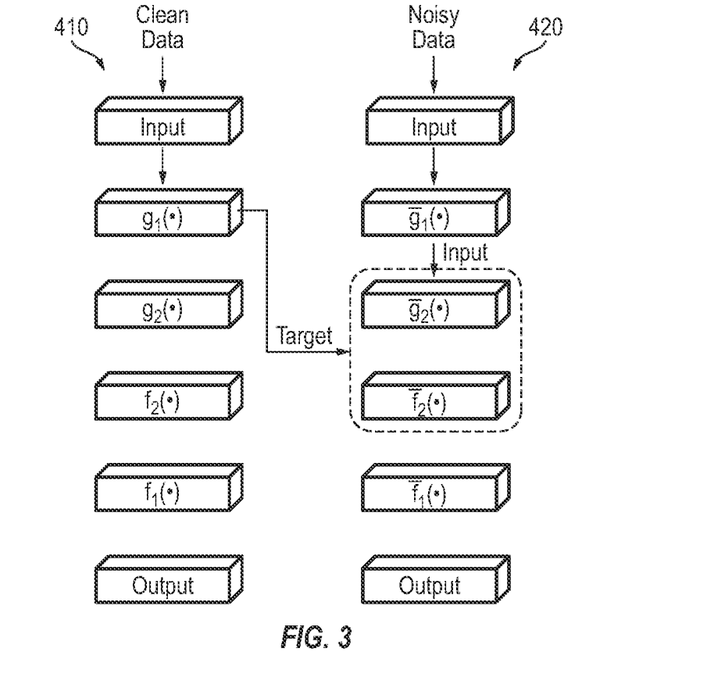
FIG. 3 is an illustration of a guided training method for a stacked sparse denoising autoencoder (SSDA), according to an embodiment.

FIG. 3 illustrates an example of training a denoising network having a SSDA architecture including two SDAs 410/420. A first one of the SDAs (e.g., the trained SDA or the clean data autoencoder) 410 has been previously trained, and the second one of the SDAs 420 begins untrained. The SDAs 410/420 may refer to the clean data network and the denoising network 300, respectively. For example, the trained SDA 410 has been trained by using clean data (e.g., on a clean or relatively noiseless image) and can be considered as a proxy for an optimal SDA.

A baseline strategy to train the second SDA (e.g., an untrained SDA or the noisy data autoencoder) 420 is to optimize Equation 20, where $\overline{f}$, $\overline{g}$ are the new encoder and decoder functions to be learned in the SDA.

$$\underset{\theta}{\operatorname{argmin}} \sum_{i=1}^{N} \| \bar{g}_1(y^i) - \bar{f}(\bar{g}(\bar{g}_1(\bar{y}^i)))\|_2^2 + \lambda_1 \Omega(\overline{H}) \qquad \text{Equation 20}$$

However, rather than using C (y) as the target data for the second SDA 420, the network, according to an embodiment of the present disclosure, utilizes $g_1(y)$, which is the encoded output of the clean network at the corresponding network stage, as the target data for the second SDA 420. Therefore, an objective function, represented by Equation 21, may be optimized.

$$\underset{\theta}{\operatorname{argmin}} \| g_1(y^i) - \bar{f}(\bar{g}(\bar{g}_1(\bar{y}^i)))\|_2^2 + \lambda_1 \Omega(\overline{H}) \qquad \text{Equation 21}$$

Instead of the latest representation assigned to y by the second SDA 420, the SSDA uses the latent representation assigned to y by the first SDA 410 as the target data because $\bar{g}(\bullet)$ is not learned by using a noisy input (e.g., a noisy input signal) whereas $g_1(\bullet)$ is learned by using a clean input (e.g., a clean input signal) and, hence, should provide a better target latent representation.

Next, the objective function (e.g., Equation 21) is regularized to train the second SDA 420 by minimizing (or optimizing) the distance between $\bar{g}(\bullet)$ and $g(\bullet)$. For example, a distance between $\bar{g}(\bullet)$ and $g(\bullet)$ is quantified by measuring the joint sparsity between latent representation h and $\bar{h}$ of dimension m, such that $H=[h^1 \ldots h^N]$.

Next, a loss function, represented by Equation 22, is optimized.

$$\underset{\theta,\bar{\theta}}{\operatorname{argmin}} \sum_{i=1}^{N} \| y^i - f(g(y^i))\|_2^2 + \lambda_1 \Theta(H) + \\ \lambda_2 \| y^i - \bar{f}(\bar{g}(\bar{y}^i))\|_2^2 + \lambda_1 \Theta(\overline{H}) + \lambda_3 \Phi(H, \overline{H}) \qquad \text{Equation 22}$$

Optimization of the loss function (e.g., Equations 19 and 22) provides joint training of the clean data autoencoder 410 and the noisy data autoencoder 420.

When the clean data autoencoder 410 is pre-trained, then its latent representation may be used as the target for pre-training each additional autoencoder (e.g., each additional encoder/decoder pair) of the noisy data autoencoder 420.

As described above with reference to FIG. 5, once the image denoising neural network has been suitably trained by the methods described herein, it may be used to denoise any suitable input image. For example, a user may take a digital image by using a cell phone camera. When the image is taken under relatively low-light conditions, it may suffer from relatively high noise, resulting in a low quality image. To remove or reduce the noise in the image, the image may be input into the image denoising neural network. The image denoising neural network may run on the processor of the cell phone, for example, and may run automatically upon the image being taken. Then, the VST network 100 will transform (or encode) the image such that it has a constant or substantially constant output variance. Next, the denoising network 300 will remove or reduce the Gaussian noise present in the image. Lastly, the IVST network 200 will transform (or decode) the image back into its original domain. Thus, an output image having less noise than the input image, thus having higher quality, is provided to a user.

Although the present disclosure has been described with reference to the example embodiments, those skilled in the art will recognize that various changes and modifications to the described embodiments may be performed, all without departing from the spirit and scope of the present disclosure. Furthermore, those skilled in the various arts will recognize that the present disclosure described herein will suggest solutions to other tasks and adaptations for other applications. It is the applicant's intention to cover by the claims herein, all such uses of the present disclosure, and those changes and modifications which could be made to the example embodiments of the present disclosure herein chosen for the purpose of disclosure, all without departing from the spirit and scope of the present disclosure. Thus, the example embodiments of the present disclosure should be considered in all respects as illustrative and not restrictive, with the spirit and scope of the present disclosure being indicated by the appended claims and their equivalents.

What is claimed is:

1. An image denoising neural network training architecture comprising:
    an image denoising neural network; and
    a clean data neural network,
    wherein the image denoising neural network and the clean data neural network are configured to share information between each other, and
    wherein each of the image denoising neural network and the clean data neural network comprises an encoder-decoder pair to output an intermediate latent representation of an input signal, and the image denoising neural network and the clean data neural network share their intermediate latent representations with each other.

2. The image denoising neural network training architecture of claim 1, wherein the image denoising neural network comprises:
    a variance-stabilizing transform (VST) network;
    an inverse variance-stabilizing transform (IVST) network; and
    a denoising network between the VST network and the IVST network.

3. The image denoising neural network training architecture of claim 2, wherein the denoising network comprises a plurality of convolutional autoencoders stacked on each other.

4. The image denoising neural network training architecture of claim 3, wherein the VST network comprises a plurality of filtering layers and rectifying layers together forming a convolutional neural network.

5. The image denoising neural network training architecture of claim 4, wherein the image denoising neural network is configured to learn a monotonic invertible transform that enforces a constant output variance of noise of an input image.

6. The image denoising neural network training architecture of claim 5, wherein a first one of the filtering layers is configured to perform a binning operation on the input image.

7. The image denoising neural network training architecture of claim 6, wherein the IVST network is trained to invert a transform of the VST network by minimizing a distance metric from an output from an identity transform and an expected output of a concatenation of the VST and the IVST networks.

8. The image denoising neural network training architecture of claim 7, wherein training of at least some of the filtering layers of the VST network and training of at least some of a plurality of filtering layers of the IVST network is interleaved.

9. The image denoising network training architecture of claim 2, wherein the image denoising neural network is trained by minimizing a mean square error distance between a noisy image and a non-noisy image input into the image denoising neural network.

10. The image denoising neural network training architecture of claim 1, wherein the clean data neural network comprises a plurality of filtering layers and rectifier layers.

11. The image denoising neural network training architecture of claim 10, wherein at least one of the filtering layers of the clean data neural network is configured to share information with at least one of a plurality of filtering layers of the image denoising neural network.

12. The image denoising neural network training architecture of claim 11, wherein the clean data neural network is trained as a plurality of encoder-decoder pairs to learn a sparse latent representation of an input image by minimizing a distance metric between a decoding of the sparse latent representation and a clean input.

13. The image denoising neural network training architecture of claim 11, wherein training of the clean data neural network is regularized by utilizing a sparsity constraint to learn a sparse latent representation.

14. A method of training an image denoising neural network, the image denoising neural network comprising a variance-stabilizing transform network, an inverse variance-stabilizing transform network, and a denoising network, the method comprising:
jointly training the variance-stabilizing transform network and the inverse variance-stabilizing transform network;
training the denoising network; and
training a clean data network,
wherein each of the denoising network and the clean data network comprises an encoder-decoder pair to output an intermediate latent representation of an input signal, and the denoising network and the clean data network share their intermediate latent representations with each other.

15. The method of claim 14, wherein the jointly training of the variance-stabilizing transform network and the inverse variance-stabilizing transform network comprises a block-coordinate descent optimization in which, at each iteration, a first parameter update is performed to decrease a variance-stabilizing transform network objective and a second parameter update is performed to decrease an inverse variance-stabilizing transform network objective.

16. The method of claim 14, wherein the jointly training of the variance-stabilizing transform network and the inverse variance-stabilizing transform network comprises utilizing a gradient-based stochastic optimization.

17. The method of claim 16, wherein the gradient-based stochastic optimization comprises an Adam algorithm.

18. The method of claim 14, wherein the training of the denoising network comprises:
inputting a denoised image into a clean data sparse denoising autoencoder;
inputting a noisy version of the denoised image into a noisy data sparse denoising autoencoder; and
training the noisy data sparse denoising autoencoder to output the denoised image by utilizing a gradient-based stochastic optimization technique.

19. The method of claim 18, wherein the noisy data sparse denoising autoencoder is trained by utilizing an objective function, and
wherein the objective function is optimized to minimize a distance metric between a decoded latent representation of the noisy version of the denoised image and a clean denoised input.

20. The method of claim 19, wherein the training of the denoising network is done jointly with the training of the clean data network by minimizing a combined cost function that minimizes squared error between decoded latent representations of the variance-stabilizing transform network and the inverse variance-stabilizing transform network and a clean denoised input.

21. The method of claim 20, wherein training is regularized to enforce individual sparsity of the latent representations of both the clean data network and the denoising network, in addition to enforcing joint sparsity between the intermediate latent representations of the clean data network and the denoising network.

22. An image denoising neural network training architecture comprising:
an image denoising neural network, the image denoising neural network comprising:
a variance-stabilizing transform (VST) network comprising a first plurality of filtering layers;
an inverse variance-stabilizing transform (IVST) network comprising a second plurality of filtering layers; and
a denoising network comprising a third plurality of filtering layers; and
a clean data network, the clean data network comprising a fourth plurality of filtering layers,
wherein the fourth plurality of the filtering layers of the clean data network are configured to communicate with a corresponding third plurality of the filtering layers of the denoising network.

* * * * *